(12) United States Patent
Greim et al.

(10) Patent No.: US 8,167,548 B2
(45) Date of Patent: May 1, 2012

(54) STEAM TURBINE

(75) Inventors: Ralf Greim, Birmenstorf (CH); Mourad Lakehel, Zurich (CH)

(73) Assignee: Alstom Technology Ltd., Baden (CH)

( * ) Notice: Subject to any disclaimer, the term of this patent is extended or adjusted under 35 U.S.C. 154(b) by 752 days.

(21) Appl. No.: 12/266,398

(22) Filed: Nov. 6, 2008

(65) Prior Publication Data
US 2009/0123276 A1 May 14, 2009

(30) Foreign Application Priority Data
Nov. 9, 2007 (CH) .................................. 1739/07

(51) Int. Cl.
*F04D 29/44* (2006.01)
*F04D 29/54* (2006.01)
(52) U.S. Cl. ..................... 415/193; 415/199.5
(58) Field of Classification Search ............... 415/199.5, 415/191, 211.2, 193
See application file for complete search history.

(56) References Cited

U.S. PATENT DOCUMENTS

| | | | | |
|---|---|---|---|---|
| 4,222,700 A | * | 9/1980 | Leuthard | 415/7 |
| 4,340,334 A | * | 7/1982 | Nixon | 415/142 |
| 5,906,474 A | | 5/1999 | Haller et al. | |
| 6,099,248 A | | 8/2000 | Mumm et al. | |
| 6,195,983 B1 | | 3/2001 | Wadia et al. | |
| 6,554,564 B1 | | 4/2003 | Lord | |
| 2003/0031564 A1 | | 2/2003 | Kawarada | |
| 2007/0071606 A1 | | 3/2007 | Borthwick et al. | |
| 2009/0257866 A1 | * | 10/2009 | Greim et al. | 415/208.1 |

FOREIGN PATENT DOCUMENTS

| | | |
|---|---|---|
| EP | 0916812 A | 5/1999 |
| EP | 1098092 A | 5/2001 |
| GB | 2129882 A | 5/1984 |
| WO | 2005005784 A | 1/2005 |

* cited by examiner

*Primary Examiner* — Chuong A Luu
*Assistant Examiner* — Nga Doan
(74) *Attorney, Agent, or Firm* — Volpe and Koenig, P.C.

(57) ABSTRACT

A steam turbine is provided having a rotor which rotates around a machine axis, and a stator which concentrically encompasses the rotor with clearance, between which an annular passage is formed which is exposed to throughflow by steam in the axial direction and in which a multiplicity of rotor blades, which are fastened on the rotor, and fixed stator blades are arranged in a plurality of stages, wherein the stator blades of the last stage have a sweep with a sweep angle which changes in sign over the relative blade height.

19 Claims, 4 Drawing Sheets

STEAM TURBINE

FIELD OF INVENTION

The present invention refers to the field of rotating thermal machines, especially to a steam turbine, the stator blades of which have sweep angles which change in their sign over the blade height.

BACKGROUND

On the stator blades in the last stage of very large steam turbines, a supersonic flow predominantly prevails on the outlet side. The influence of the flow angle, which is customarily brought about as a result of the incidence angle of the stator blades, in this case is determined to a great extent as a result of the supersonic expansion and the shock fronts. In addition, the design engineer is confronted with the situation that the stage reaction degree is undesirably subjected to sharp radial changes. There are different ways of influencing these parameters, such as by applying a twisting of the blade profile over the blade height ("twist" in English), an inclination of the blade airfoil in the tangential or circumferential direction ("lean" in English), and the use of special supersonic profiles. Furthermore, the blade airfoil can have a sweep, or inclination in the meridional plane ("sweep" in English), in order to influence the flow. The latter inclination is typically specified by a sweep angle in the meridional plane ("sweep angle") which is included by a radial to the rotor axis and by a tangent which lies against the blade airfoil in the meridional plane, wherein the sign of the angle measured from the radial is critical. However, other inherently dependent flow parameters are also altered in this case. In the case of large steam turbines, large variations of the hub radius and casing radius additionally lead to special flow structures which are to be implemented with a local inclination and incidence of the blades only with difficulty in order to achieve the set aims with regard to the radial flow angle variation and reaction degree variation.

For increasing the efficiency in the case of the stator blades in the last stage of a steam turbine, it has been proposed in U.S. Pat. No. 5,906,474 to provide rounded corners at the transitions between the blade airfoil and the base.

In contrast, in WO-A1-2005/005784 it is proposed to provide the turbine blades (both stator blades and rotor blades) with a sweep which is negative on the rotor-side and stator-side edge zones of the blade, and which changes into positive in the middle region in between.

SUMMARY

The present disclosure relates to a steam turbine with a rotor, which rotates around a machine axis, and a stator, which concentrically encompasses the rotor with clearance, between which an annular passage is formed which is exposed to throughflow by steam in the axial direction. A multiplicity of rotor blades, which are fastened on the rotor, and fixed stator blades are arranged in a plurality of stages, wherein the stator blades of the last stage have a sweep with a sweep angle that changes over the relative blade height. The sweep is formed with an S-shape with a sweep angle which both adjacent to the stator and adjacent to the rotor is positive, and at mid-height of the stator blade is negative.

BRIEF DESCRIPTION OF THE DRAWINGS

The invention is subsequently explained in more detail based on exemplary embodiments in conjunction with the drawing. In the drawings:

FIG. 4b shows a view of the pitch ratio as is applied in FIG. 4a.

DETAILED DESCRIPTION OF THE PREFERRED EMBODIMENTS

Introduction to the Embodiments

Figure 1:
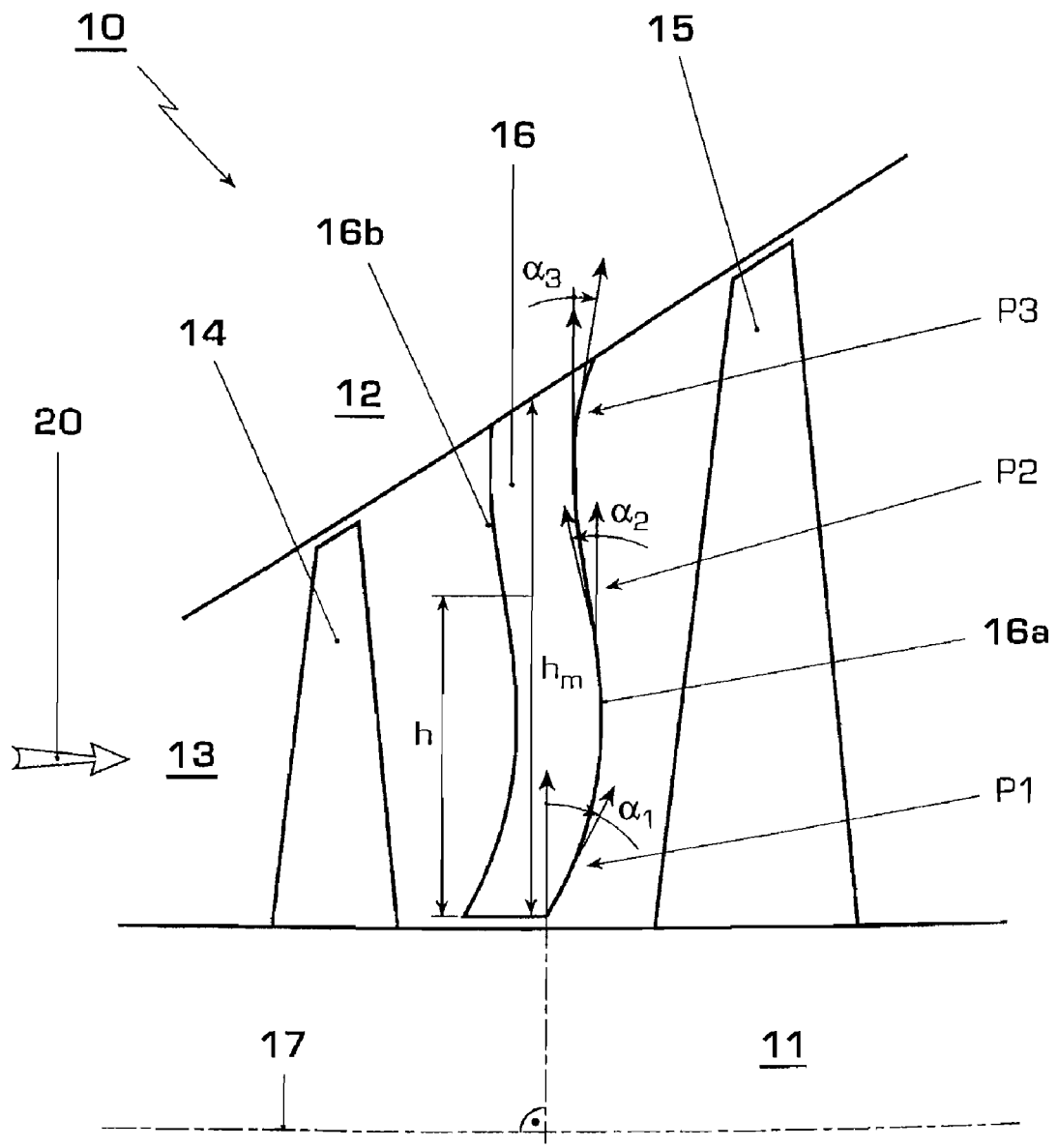
FIG. 1 shows a detail of the last stage of a developed steam turbine with a stator blade with S-shaped sweep according to an exemplary embodiment of the invention.

It is the object of the invention to optimize a steam turbine of the type mentioned in the introduction to the effect that the stage reaction degree is improved.

The object is achieved by the features of claim 1. It is a feature of the invention that the sweep of the stator blades of the last stage is formed with an S-shape by the sweep angle being positive both on the casing side (i.e. adjacent to the stator) and on the hub side (i.e. adjacent to the rotor), and by being negative at mid-height of the stator blade. In this case, a positive sweep angle is defined by the measurement direction in the clockwise sense from a radial to the rotor axis towards the tangent to the stator blade in the meridional plane, and a negative sweep angle is correspondingly defined by a measurement direction in the counterclockwise sense from a radial to the rotor axis towards the tangent to the stator blade.

The S-shaped sweep of the stator blades in the last stage of a steam turbine according to the invention is especially suitable for effectively controlling the pressure between the blades and the residual kinetic energy. The principal aerodynamic effect is that the stage reaction at the hub is reduced and on the other hand increased at the blade tip by the entry angle to the rotor blades being altered. The delivered output and the pressure distribution at the outlet of the subsequent rotor blade of the last stage follow the same pattern in this case. The kinetic energy is advantageously reduced. A feature of the invention provides an improved blade design without increase of the secondary flows.

In an embodiment, the stator blades of the last stage have a leading edge, a trailing edge and a center of gravity line, wherein the leading edge, the trailing edges and the center of gravity line have a sweep in each case, which according to the invention is S-shaped. In particular, the S-shaped progression of the sweep angle in dependence upon the relative blade height is homogeneous for the leading edge, the trailing edge and the center of gravity line in the sense of the progression of the sweep angle over the blade height from the positive to the negative, and to the positive again.

In a further embodiment, the stator blades of the last stage have a leading edge line, a trailing edge line and center of gravity line, wherein two of these three lines have a sweep which according to the invention is S-shaped. In this case, the S-shaped progression of the sweep of two of the three lines is again homogeneous in the aforementioned sense.

In another embodiment, the stator blades of the last stage have a leading edge line, a trailing edge line and a center of gravity line, wherein either the leading edge, trailing edge or the center of gravity line has a sweep which according to the invention is S-shaped.

In a further embodiment, the trailing edge of the stator blades has a sweep in each case which according to the invention is S-shaped. This development has the special advantage that the effect with regard to stage reaction is extremely great.

In a still further embodiment, the sweep angle on the hub side, i.e. adjacent to the rotor, and on the casing side, i.e. adjacent to the stator, lies in the range of between 10° and 25°, and at mid-height lies in the range of between 0° and −15°. Furthermore, the sweep angle is preferably negative in a range of the relative blade height of 30 to 80%.

In another embodiment, the sweep angle on the hub side, i.e. adjacent to the rotor, and on the casing side, i.e. adjacent to the stator, lies in the range of between 13° and 20°, and at mid-height lies in the range of between −6° and −10°. Furthermore, the sweep angle is preferably negative in a range of the relative blade height of 30 to 80%.

For simultaneous influencing of the flow parameters, an embodiment, in addition to the sweep in the stator blades of the last stage, has an inclination in the circumferential direction, i.e. in the direction tangentially to the rotor of the steam turbine ("lean"), wherein in particular the inclination angle varies over the blade height, for example having a particularly increasingly negative inclination angle which decreases from the hub towards the casing. In this case, positive inclination angles, as seen in the direction of the steam flow through the turbine, are defined by the angle from a radial to the rotor axis in the clockwise sense to the tangent to the stator blade, and negative inclination angles are correspondingly defined by the angle from a radial in the counterclockwise sense to the rotor axis to the tangent to the stator blade.

In a further embodiment, the inclination angle of the trailing edge line varies in the tangential or circumferential direction, and with regard to a radial to the turbine rotor axis varies between +5° and −5° on the hub side and between −10° and +5° on the casing side.

In a further embodiment, the stator blade additionally has a pitch ratio which varies radially to the rotor axis, wherein this pitch ratio increases as the blade height increases. The pitch ratio is equal to the ratio of pitch or distance between adjacent stator blades in a blade ring along the circumferential line to the length of the chord of a stator blade. In particular, with a blade height of zero at the hub the pitch ratio has a value in the range of 0.4 to 0.5, and with a maximum blade height at the casing at the blade root has a value in the range of 0.45 to 0.65.

DETAILED DESCRIPTION

FIG. 1 shows a detail of the last stage of a steam turbine 10 which comprises a rotor 11, with rotor blades 14, 15, which is rotatable around a turbine rotor axis 17 and concentrically encompassed with a clearance by a stator 12. Between consecutively following rows of rotor blades 14, 15, a row of fixed stator blades 16 is arranged, by which the steam flow 20 which flows in the annular passage 13 between rotor 11 and stator 12 is deflected for the following rotor blade row 15.

According to the invention, the stator blades 16 have a sweep with a sweep angle $\alpha_1$, $\alpha_2$, $\alpha_3$ which changes over the relative blade height (the blade height h begins at the hub and refers to the maximum height $h_m$). The angles are measured beginning on the radial which is perpendicular to the turbine rotor axis 17 and ending on the meridional tangent to a reference line on the stator blade 16, in this case the trailing edge 16a of the blade. The angles are positive if the measurement direction is in the clockwise sense, and negative if the measurement direction is in the counterclockwise sense. According to the invention, the sweep angle $\alpha_1$ adjacent to the rotor (Position P1) and $\alpha_3$ adjacent to the stator (Position P3) is positive, wherein the sweep angle $\alpha_2$ at a mid-height of the stator blade 16 (Position P2) is negative. As a result of the changing sign of the angles over the blade height, a sweep formed with an S-shape is created. In the exemplary embodiment which is shown, the sweep is formed with an S-shape both on the trailing edge 16a, on the leading edge 16b, and along the center of gravity line of the stator blade 16.

In further embodiments, as mentioned previously, just one of the three reference lines (trailing edge, leading edge, center of gravity line) of the blade, or two of the three reference lines, can have a sweep of this type.

Figure 2:
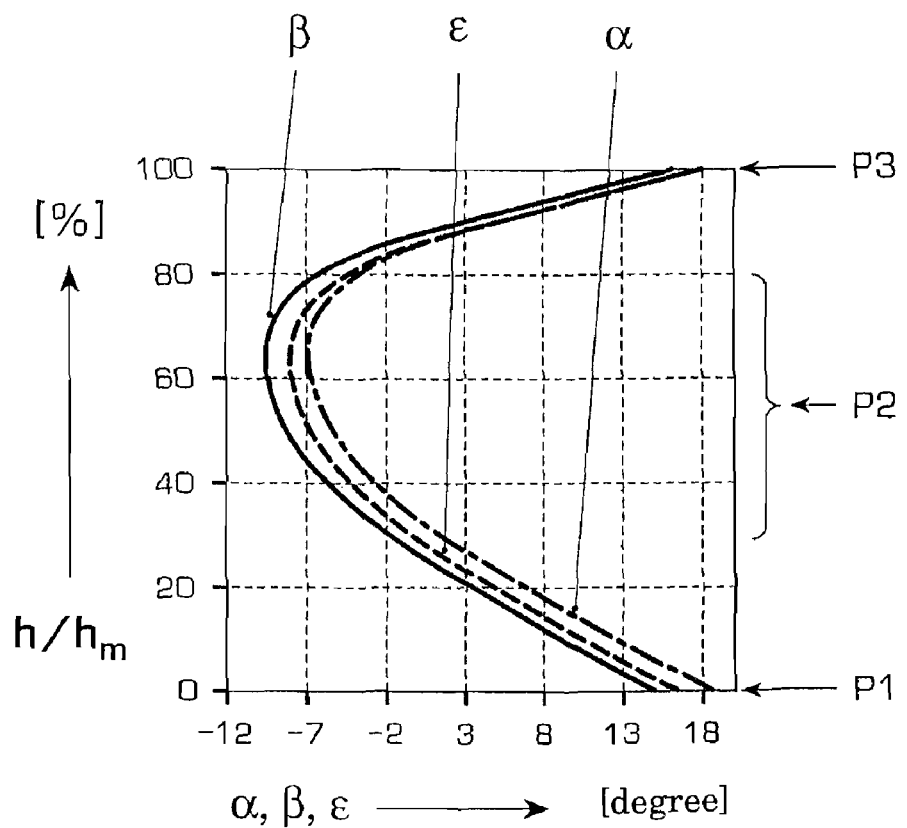
FIG. 2 shows the curves of the dependence of different sweep angles upon the relative height of the stator blades, with an S-shaped sweep, according to an exemplary embodiment of the invention.

A preferred development of the sweep is reproduced in FIG. 2 based on the sweep angle of the leading edge ($\beta$), of the trailing edge ($\alpha$) and of the center of gravity line ($\epsilon$) in dependence upon the relative blade height $h/h_m$. The sweep is S-shaped in all three cases. In particular, the curve progression of the sweep angle $\beta$, or $\gamma$, or $\alpha$ is homogeneous in dependence upon the relative blade height $h/h_m$ for the leading edge 16b, for the trailing edge 16a and for the center of gravity line. The sweep angles $\alpha$, $\beta$ and $\epsilon$ adjacent to the rotor 11 (Position P1) and adjacent to the stator 12 (Position P3) lie in the range of between 13° and 20°. At mid-height (Position P2), the sweep angle lies in the range of between −6° and −10°. As can be seen from FIG. 2, the sweep angle is negative in a range of the relative blade height $h/h_m$ of 30% to 80%.

In a further development, the sweep angle at mid-height (Position P2) is in the range of between 0° and 15°, and the sweep angle in the edge zones (Positions P1 and P3) is in the range of between 10° and 25°.

Figure 3A:
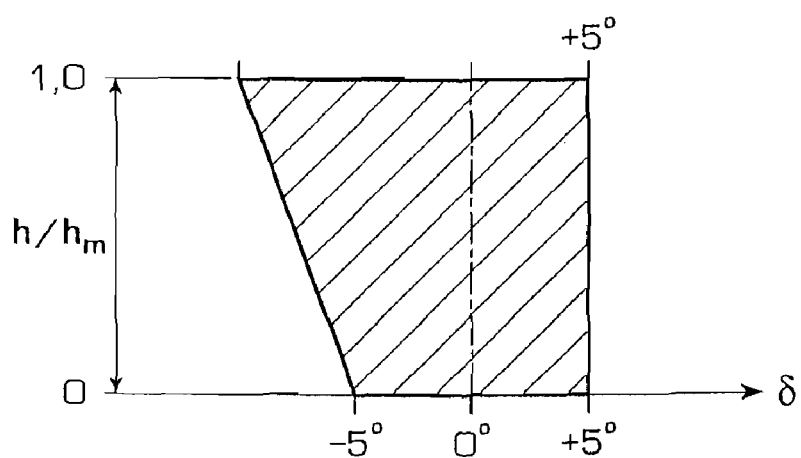
FIG. 3a shows ranges for the inclination angle δ in dependence upon the relative height of the stator blades, with an S-shaped sweep, according to an exemplary embodiment of the invention.
Figure 3B:
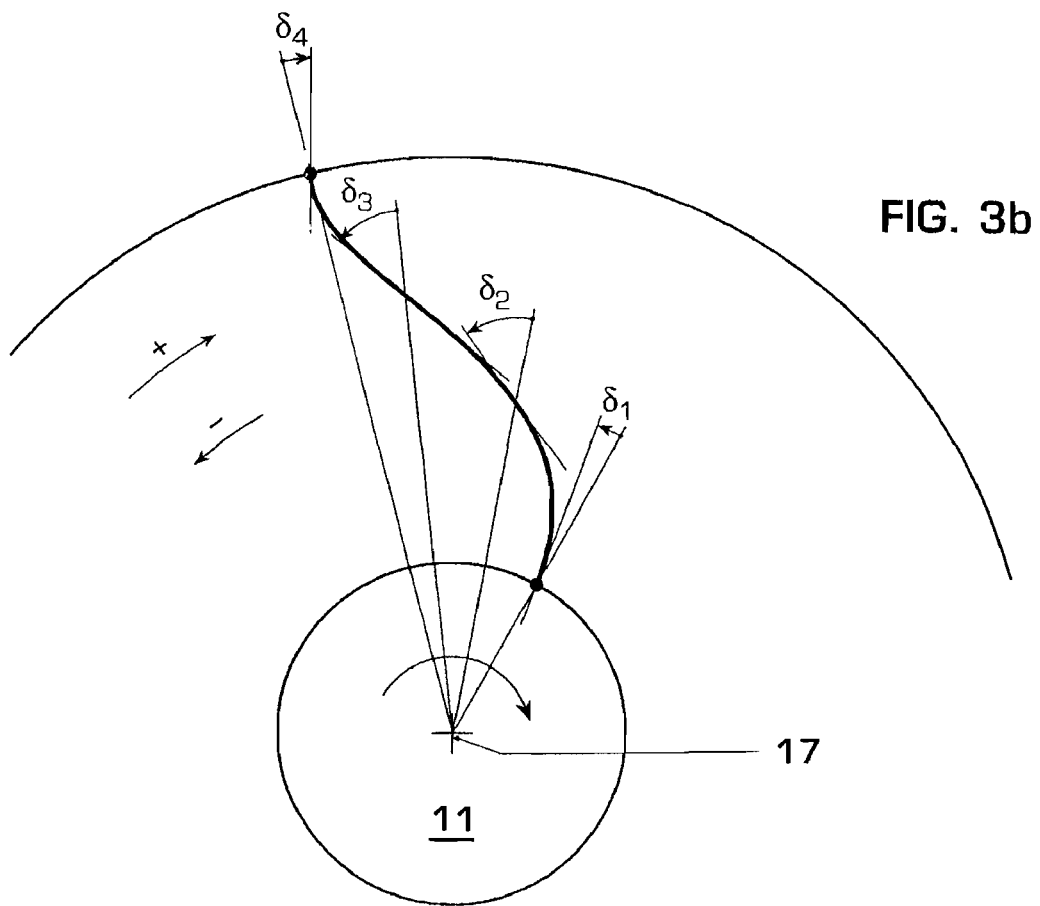
FIG. 3b shows a view of the inclination angle of a chosen line of a blade of a steam turbine.
Figure 3C:
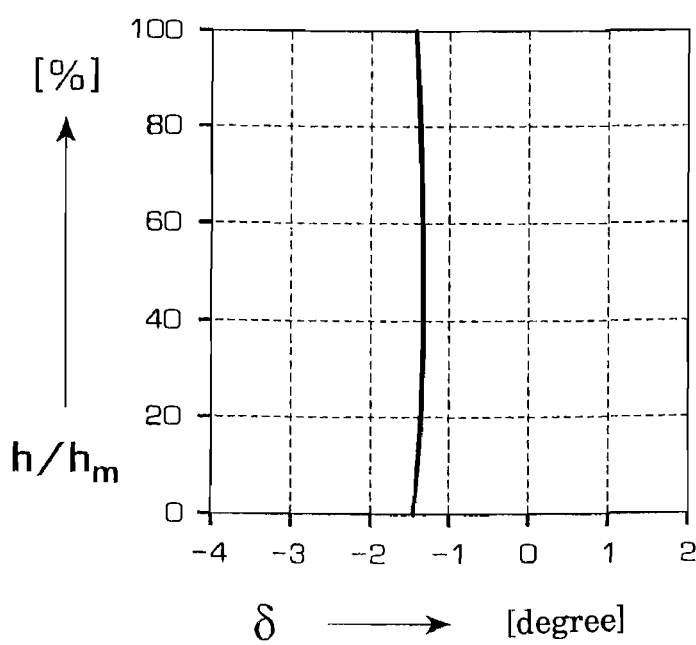
FIG. 3c shows values of the inclination angle δ at the trailing edge of a stator blade in a steam turbine according to the invention in dependence upon the blade height.

While the sweep of the stator blades 16 are in reference to a meridional plane which passes through the machine axis or turbine rotor axis 17, the stator blades 16 are inclined in the circumferential direction, that is to say in a plane which is perpendicular to the machine axis 17, and with regard to a radial to the turbine rotor axis 17. In the case of an inclination of this type which varies over the blade height and changes in sign, a curvature is created. FIG. 3a shows the ranges in which the inclination angle over the relative blade height can move for an exemplary embodiment of the invention. With a blade height of zero (at the hub), the inclination angles are in a range of between −5° and +5°, and with a full blade height are in the range of between −10° and +5°. FIG. 3b shows inclination angles $\delta_1$, $\delta_2$, $\delta_3$ and $\delta_4$, shown at different blade heights, for a chosen line or edge of a blade. The angles are measured in each case beginning on a radial through a point on the selected line and ending on the tangent to the line at the point concerned, wherein an angle which is measured in the clockwise sense is positive ($\delta_4$) and angles which are measured in the counterclockwise sense are negative ($\delta_1$, $\delta_2$, $\delta_3$). In one exemplary embodiment of the invention, the local inclination angles $\delta$ are reproduced in FIG. 3c in dependence upon the relative height $h/h_m$ for the trailing edge 16a.

Figure 4A:
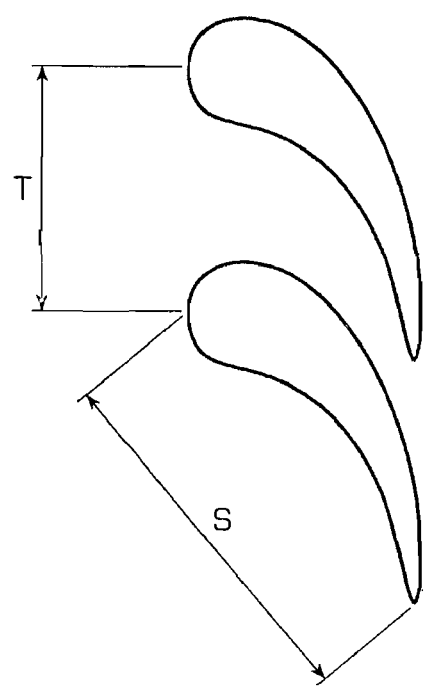
FIG. 4a shows the pitch ratio of a stator blade of a steam turbine according to the invention in dependence upon the relative blade height.
Figure 4B:
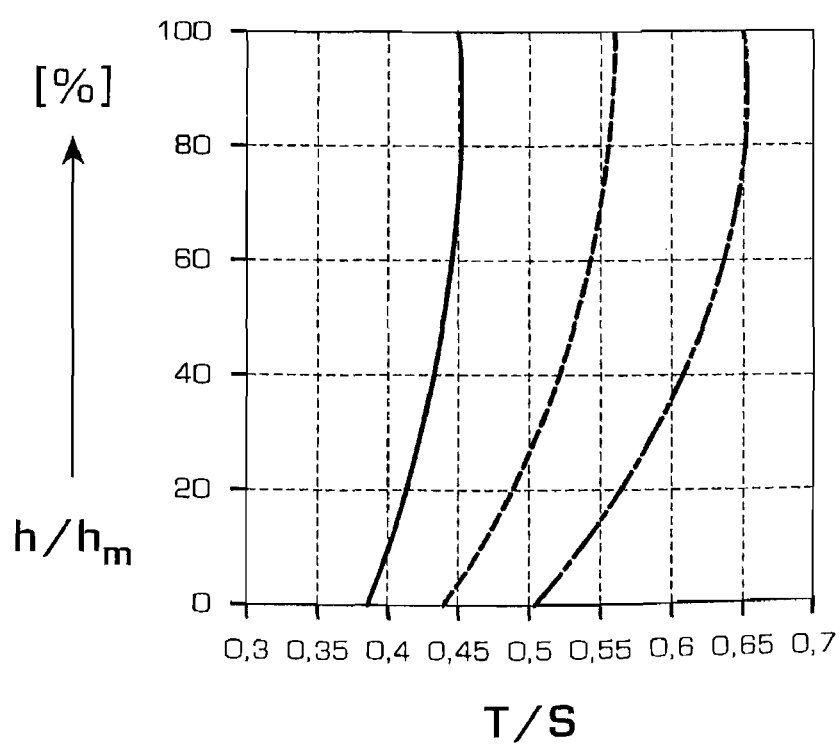

In a further exemplary embodiment of the invention, the stator blade of the steam turbine additionally has a pitch ratio which varies with the blade height and is defined by the ratio of the pitch between adjacent stator blades and the chord length. FIG. 4a shows some stator blades of a blade ring projected onto the plane, and also the pitch T between adjacent stator blades 16, and also the chord length S, which are critical for the pitch ratio T/S. FIG. 4b shows the value ranges of the pitch ratio T/S as a function of the relative blade height $h/h_m$. With a minimum blade height, the pitch ratio moves in a range of between 0.4 and 0.5, and with a maximum blade height moves in a range of between 0.45 and 0.65.

LIST OF DESIGNATIONS

10 Steam turbine
11 Rotor
12 Stator
13 Annular passage
14, 15 Rotor blade
16 Stator blade
16a Trailing edge of the stator blade
16b Leading edge of the stator blade
17 Machine axis
20 Steam flow
h Blade height
$h_m$ Max. blade height
$\delta_1, \delta_2, \delta_3, \delta_4$ Inclination angle
S Chord length
P1, . . . , P3 Position
$\beta$ Sweep angle (leading edge)
$\epsilon$ Sweep angle (center of gravity line)
$\alpha, \alpha_1, \alpha_2, \alpha_3$ Sweep angle (trailing edge)

What is claimed is:

1. A steam turbine (10) with a rotor (11) which rotates around a machine axis (17), and a stator (12) which concentrically encompasses the rotor (11) with clearance, between which an annular passage (13) is formed which is exposed to throughflow by steam (20) in the axial direction and in which a multiplicity of rotor blades (14, 15), which are fastened on the rotor (11), and fixed stator blades (16) are arranged in a plurality of stages, wherein the stator blades (16) of the last stage have a sweep with a sweep angle ($\alpha, \alpha_1, \alpha_2, \alpha_3, \beta, \epsilon$) which changes over the relative blade height ($h/h_m$), the sweep is formed with an S-shape with a sweep angle ($\alpha, \alpha_1, \alpha_2, \alpha_3, \beta, \epsilon$) which both adjacent to the stator (12) and adjacent to the rotor (11) is positive, and at mid-height of the stator blade (16) is negative.

2. The steam turbine (10) as claimed in claim 1, wherein the stator blades (16) of the last stage have a leading edge (16b), a trailing edge (16a) and a center of gravity line, and the S-shaped sweep extends along the leading edge (16b), the trailing edge (16a) and the center of gravity line.

3. The steam turbine (10) as claimed in claim 1, wherein the stator blades (16) of the last stage have a leading edge (16b), a trailing edge (16a) and a center of gravity line, and the S-shaped sweep extends along two of the three lines which are trailing edge, leading edge and center of gravity line.

4. The steam turbine (10) as claimed in claim 1, wherein the stator blades (16) of the last stage have a leading edge (16b), a trailing edge (16a) and a center of gravity line, and the S-shaped sweep extends along either the trailing edge, the leading edge or the center of gravity line.

5. The steam turbine (10) as claimed in claim 1, wherein the stator blades (16) of the last stage have a trailing edge (16a) and the S-shaped sweep extends along the trailing edge (16a).

6. The steam turbine (10) as claimed in claim 3, wherein the curve progression of the sweep angle ($\alpha, \alpha_1, \alpha_2, \alpha_3, \beta, \epsilon$) in dependence upon the relative blade height ($h/h_m$) is homogeneous for the leading edge (16b), for the trailing edge (16a) and for the center of gravity line.

7. The steam turbine (10) as claimed in claim 3, wherein the sweep angle ($\alpha, \alpha_1, \alpha_2, \alpha_3, \beta, \epsilon$) adjacent to the rotor (11) and adjacent to the stator (12) lies in the range of between 10° and 20°, and at mid-height lies in the range of between −6° and −10°.

8. The steam turbine (10) as claimed in claim 3, wherein the sweep angle ($\alpha, \alpha_1, \alpha_2, \alpha_3, \beta, \epsilon$) adjacent to the rotor (11) and adjacent to the stator (12) lies in the range of between 10° and 25°, and at mid-height lies in the range of between 0° and −15°.

9. The steam turbine (10) as claimed in claim 1, wherein the sweep angle ($\alpha, \alpha_1, \alpha_2, \alpha_3, \beta, \epsilon$) is negative in a range of the relative blade height ($h/h_m$) of 30% to 80%.

10. The steam turbine (10) as claimed in claim 1, wherein the stator blades (16) of the last stage have an inclination ($\delta$) in the circumferential direction, with regard to a radial to the turbine rotor axis (17).

11. The steam turbine (10) as claimed in claim 10, wherein the inclination angles ($\delta$) vary over the blade height (h).

12. The steam turbine (10) as claimed in claim 11, wherein the inclination angles continuously decrease over the blade height (h) from the hub to the casing of the steam turbine.

13. The steam turbine (10) as claimed in claim 11, wherein the inclination angle ($\delta$) of the trailing edge (16a) with regard to a radial to the rotor axis (17) of the steam turbine lies in a range of between −5° and +5° with minimum blade height (h), and lies in a range of between −10° and +5° with maximum blade height (h).

14. The steam turbine (10) as claimed in claim 1, wherein the pitch ratio (T/S) of the stator blades (16) of the last stage of the steam turbine (10) lies in a range of between 0.4 and 0.5 with minimum blade height (h), and lies in a range of between 0.45 and 0.65 with maximum blade height (h).

15. The steam turbine (10) as claimed in claim 4, wherein the curve progression of the sweep angle ($\alpha, \alpha_1, \alpha_2, \alpha_3, \beta, \epsilon$) in dependence upon the relative blade height ($h/h_m$) is homogeneous for the leading edge (16b), for the trailing edge (16a) and for the center of gravity line.

16. The steam turbine (10) as claimed in claim 4, wherein the sweep angle ($\alpha, \alpha_1, \alpha_2, \alpha_3, \beta, \epsilon$) adjacent to the rotor (11) and adjacent to the stator (12) lies in the range of between 10° and 20°, and at mid-height lies in the range of between −6° and −10°.

17. The steam turbine (10) as claimed in claim 5, wherein the sweep angle ($\alpha, \alpha_1, \alpha_2, \alpha_3, \beta, \epsilon$) adjacent to the rotor (11) and adjacent to the stator (12) lies in the range of between 10° and 20°, and at mid-height lies in the range of between −6° and −10°.

18. The steam turbine (10) as claimed in claim 4, wherein the sweep angle ($\alpha, \alpha_1, \alpha_2, \alpha_3, \beta, \epsilon$) adjacent to the rotor (11) and adjacent to the stator (12) lies in the range of between 10° and 25°, and at mid-height lies in the range of between 0° and −15°.

19. The steam turbine (10) as claimed in claim 5, wherein the sweep angle ($\alpha, \alpha_1, \alpha_2, \alpha_3, \beta, \epsilon$) adjacent to the rotor (11) and adjacent to the stator (12) lies in the range of between 10° and 25°, and at mid-height lies in the range of between 0° and −15°.

* * * * *